United States Patent
Yanagisawa

[11] Patent Number: 5,881,981
[45] Date of Patent: Mar. 16, 1999

[54] ELASTOMERIC SPRING

[75] Inventor: Mitsuo Yanagisawa, Yachiyo, Japan

[73] Assignee: Pearl Musical Instrument Co., Chiba, Japan

[21] Appl. No.: 885,868

[22] Filed: Jun. 30, 1997

[51] Int. Cl.[6] .................................................. A47B 91/00
[52] U.S. Cl. ........................................ 248/188.8; 248/615
[58] Field of Search .............................. 248/188.8, 188.9, 248/599, 615, 632, 677, 619, 621, 634; 267/141.5; 84/411 R, 421

[56] References Cited

U.S. PATENT DOCUMENTS

| | | | |
|---|---|---|---|
| D. 338,223 | 8/1993 | Mine | D17/99 |
| 1,876,704 | 9/1932 | Lipcot | 267/141.5 |
| 2,422,683 | 6/1947 | Kaemmerling | 248/188 |
| 2,670,914 | 3/1954 | Jones | 248/188.9 |
| 2,744,283 | 5/1956 | Reineman | 16/42 R |
| 3,199,819 | 8/1965 | Widmark | 248/188.9 |
| 3,270,998 | 9/1966 | Keetch | 267/140.3 |
| 3,412,990 | 11/1968 | Gladstone | 267/220 |
| 3,779,536 | 12/1973 | Lachmann | 267/140 |
| 4,767,105 | 8/1988 | Caspers | 267/140 |
| 4,781,365 | 11/1988 | Harrison | 267/294 |
| 4,869,147 | 9/1989 | Hoshino | 84/421 |
| 4,936,558 | 6/1990 | Orlandi | 267/292 |
| 5,069,102 | 12/1991 | Wolf | 248/188.9 |
| 5,149,066 | 9/1992 | Snaith et al. | 267/136 |
| 5,165,636 | 11/1992 | Grissom | 248/188.3 |
| 5,238,233 | 8/1993 | Hein | 267/153 |
| 5,280,890 | 1/1994 | Wydra | 267/220 |
| 5,297,771 | 3/1994 | Gilbert | 248/688 |

*Primary Examiner*—Ramon O. Ramirez
*Assistant Examiner*—Anita M. King
*Attorney, Agent, or Firm*—Longacre & White

[57] ABSTRACT

A spring formed of an elastomeric body suitable to isolate vibrations transmitted from a support structure. A recess is formed in one end of the body to retain a portion of the supporting structure. A second end is adapted to be placed on an underlying surface such that the spring is disposed between the underlying surface and the support structure. A channel or hollow portion extends through the body to allow the second end to deform and thereby isolate vibrations from the underlying surface. The spring is particularly useful in isolating vibrations generated from a musical drum.

15 Claims, 1 Drawing Sheet

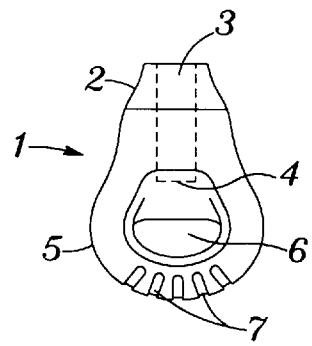
FIG. 1
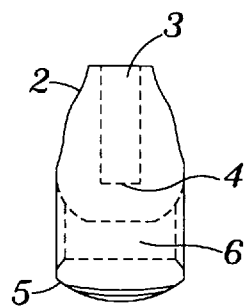
FIG. 2
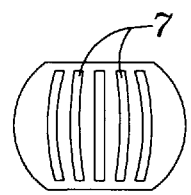
FIG. 3
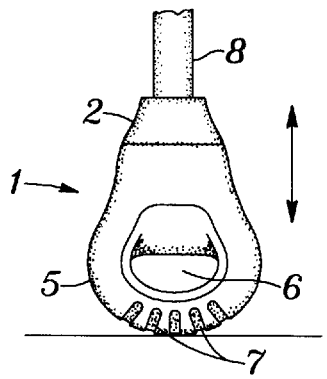
FIG. 4
FIG. 5
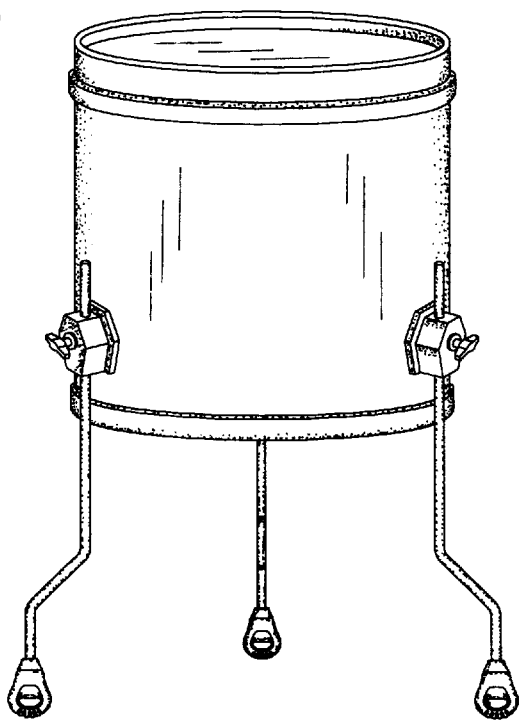

ELASTOMERIC SPRING

BACKGROUND OF THE INVENTION

1. Field of the Invention

This invention pertains to elastomeric springs and particularly to an elastomeric spring adapted to isolate vibrations from a support stand.

2. Description of the Prior Art

Elastomeric springs are not new. U.S. Pat. No. 4,781,365 discloses an elastomeric spring for use in a vehicle suspension. U.S. Pat. No. 3,779,536 to Lachmann discloses a hollow elastomeric bumper. These springs are design to absorb large compression loads and suffer from the drawback that they are not suited to be placed on a ground surface nor have the ability to retain a leg of a support stand.

U.S. Pat. No. 2,744,283 discloses a resilient body having a tubular bore to retain a furniture leg. U.S. Pat. No. 5,297,771 discloses rubber stopper affixed to an end of a musical stand. However, these devices suffer from the drawback that there is no hollow portion to enhance deformation so as to absorb vibrations.

It is the object of the present invention to alleviate the drawbacks of the prior art by providing an elastomeric spring which may retain a support member of a stand and isolate vibrations from an underlying surface.

SUMMARY OF THE INVENTION

A spring is formed of an elastomeric body suitable to isolate vibrations transmitted from a support structure. A recess extending to and terminating at a bottom wall is formed in one end of the body to retain and support a portion of a supporting structure. A second end is adapted to be placed on an underlying surface such that the spring is disposed between the underlying surface and the supporting structure. A channel or hollow portion extends through the body to allow the second end to deform and thereby isolate vibrations from the underlying surface. The spring is particularly useful in isolating vibrations generated from a musical drum.

BRIEF DESCRIPTION OF THE DRAWINGS

FIG. 1 a front view of the elastomeric spring according to the present invention.

FIG. 2 s a side view of the elastomeric spring according to the present invention.

FIG. 3 is a bottom view of the elastomeric spring according to the present invention.

FIG. 4 is a side view of the elastomeric spring and a portion of a supporting member on an underlying surface.

FIG. 5 is perspective view of the elastomeric spring attached to a drum stand according to the preferred embodiment of the present invention.

DETAILED DESCRIPTION OF THE PREFERRED EMBODIMENT

FIG. 1 illustrates a side view of the elastomeric spring (1). The elastomeric spring (1) has a first end (2) with a recess (3) extending to a back wall (4). The recess (3) is open at the first end (2) of the elastomeric spring (1) to receive an extension of a supporting member (8). The back wall (4) serves as a stop to limit the extent to which the supporting member extends into the elastomeric body (1).

The elastomeric spring (1) has a second end (5). A hollowed portion (6), or channel, is formed through the second end of (5) of the elastomeric spring (1). The presence of the hollowed portion 6 allows the second end (5) of the elastomeric body (1) to deform when vibrations or other loads are transmitted to the first end (2) through the supporting member. In the preferred embodiment the hollowed portion (6) is substantially semi-cylindrically shaped and the second end (5) of the elastomeric body (1) is semi-spherically shaped.

A plurality of corrugations (7) are formed on the outer surface of the second end (5) to inhibit the elastomeric body from slipping when placed on an underlying surface.

The elastomeric spring (1) is preferably used to isolate vibrations emanating from a supporting member. An extension portion of a supporting member is simply placed within recess (3) and the elastomeric spring along with the supporting member are placed on an underlying surface as shown in FIG. 4. The second end (5) of the elastomeric spring (1) is positioned adjacent to the underlying surface. The corrugations (7) inhibit the elastomeric spring (1) and supporting member from slipping.

When vibrations or other loads are transmitted to the elastomeric spring from the supporting member, the arcuate shaped second end deforms and flattens thereby absorbing the load.

In the preferred embodiment, the elastomeric spring is used to isolate vibrations emanating from a musical drum. FIG. 5 represents such an arrangement. A drum is supported on a support stand having a plurality of legs. The ends of these legs are at least partially disposed within the recess (3) extending to the back wall (4). The size of the recess (3) is designed to snugly accommodate a portion of the leg to ensure that the elastomeric spring is firmly attached to the supporting leg.

Tom Tom drums all suffer from the common drawback that vibrations emanating from the drum head are transferred from the drum shell to the supporting legs and finally to the floor. This transfer of energy shortens the sustain of the drum thus causing the drum to sound constricted. Placing the elastomeric spring (1) between the floor and supporting legs effectively isolates the drum from the floor thereby substantially increasing the drum's sustain.

The elastomeric spring (1) is preferably made of a soft compound. The combination of a soft elastomeric compound and a hollowed portion has been shown to improve the performance of Tom Tom drums. The elastomeric spring (1) is also preferably homogeneously formed as a unitary body, thus alleviating the cost of assembling multiple components and simplifying its manufacture.

While the foregoing invention has been shown and described with reference to a preferred embodiment, it will be understood by those possessing skill in the art that various changes and modifications may be made without departing from the spirit and scope of the invention.

I claim:

1. A spring comprising:

a solid unitary body formed of elastomeric material having a top and bottom portion spaced apart in a vertical direction, said body having a recess formed in said top portion adapted to receive and retain a support member, said recess terminating at a bottom wall to limit penetration of said support member, said bottom portion being substantially opposite said top portion and adapted to be placed on a surface, said body having a hollow portion disposed between said first and second ends extending through said solid unitary body in a direction substantially perpendicular to said vertical direction wherein said unitary body continuously circumscribes said hollow portion in a plane parallel to said vertical direction, wherein, said elastomeric body is adapted to isolate vibrations transmitted through said member from said surface.

2. The spring according to claim 1, wherein a plurality of corrugations are formed on an exterior surface of said bottom portion to inhibit said elastomeric body from slipping with respect to said surface.

3. The spring according to claim 1, wherein said hollow portion comprises a semi-cylindrical channel extending through said solid unitary body.

4. The spring according to claim 3, wherein said semi-cylindrical channel extends substantially perpendicular to said vertical direction.

5. The spring according to claim 3, wherein said bottom portion is arcuate shaped, said semi-cylindrical channel being substantially concentric with said arcuate shaped bottom portion.

6. The spring according to claim 3, wherein said bottom portion is substantially semi-spherical shaped, said semi-cylindrical channel being substantially concentric with said semi-spherical shaped bottom portion.

7. The spring according to claim 1, wherein said hollow portion is a whole extending completely through said solid unitary body thereby defining a substantially ring-shape solid body portion of said unitary solid body.

8. A combination spring and musical stand, said spring comprising;

at least one solid unitary body formed of elastomeric material, said body having a recess extending inwardly to a rear wall formed at a first end, a second end adapted to be placed on a surface, and a hollowed channel extending completely through said solid unitary body disposed between said first and second ends so as to define a continuously formed substantially doughnut shaped solid portion; said musical stand comprising: at least one leg adapted to support a musical instrument, a portion of said leg being disposed within and retained by said recess of said elastomeric body; wherein, said rear wall of said recess forms a stop to limit penetration of said leg within said solid unitary body; and said elastomeric body is adapted to isolate vibrations generated from said musical instrument from said surface.

9. The combination spring and musical stand according to claim 8, wherein said spring comprises a plurality of elastomeric bodies and said musical stand comprises a plurality of legs each partially disposed within one of said recesses of one of said elastomeric bodies, whereby said musical stand supports a drum.

10. The combination spring and musical stand according to claim 8, wherein a plurality of corrugations are formed on an exterior surface of said body adjacent said second end to inhibit said elastomeric body from slipping with respect to said surface.

11. The combination spring and musical stand according to claims 8, wherein said hollowed channel comprises a semi-cylindrical channel extending through said second end of said elastomeric body.

12. The combination spring and musical stand according to claim 11, wherein said semi-cylindrical channel extends substantially perpendicular to an axis of said recess.

13. The combination spring and musical stand according to claim 11, wherein said second end is arcuate shaped, said semi-cylindrical channel extending through said second end and being substantially concentric with said arcuate shaped head.

14. The combination spring and musical stand according to claim 11, wherein said second end is substantially semi-spherical shaped, said semi-cylindrical channel extending through said second end and being substantially concentric with said semi-spherical shaped head.

15. An elastomeric spring comprising:

a solid unitary body formed of elastomeric material having a substantially toroid shaped portion and a top portion extending therefrom, said top portion having a recess formed therein adapted to receive and retain a support member, said recess terminating at a bottom wall to limit penetration of said support member, said substantially toroid shaped portion completely circumscribing a hollow channel and having a continuous thickness in both a radial and longitudinal direction.

\* \* \* \* \*